(12) United States Patent
Brück et al.

(10) Patent No.: US 7,169,341 B2
(45) Date of Patent: Jan. 30, 2007

(54) PROCESS FOR PRODUCING EXTRUDED HONEYCOMB BODIES AND EXTRUSION DIE

(75) Inventors: Rolf Brück, Bergisch Gladbach (DE); Wolfgang Maus, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 150 days.

(21) Appl. No.: 10/653,795

(22) Filed: Sep. 3, 2003

(65) Prior Publication Data

US 2004/0041296 A1  Mar. 4, 2004

Related U.S. Application Data

(63) Continuation of application No. PCT/EP02/02122, filed on Feb. 28, 2002.

(30) Foreign Application Priority Data

Mar. 16, 2001  (DE)  ................................. 101 13 290

(51) Int. Cl.
   *B29C 47/00*  (2006.01)
(52) U.S. Cl. ................ 264/150; 264/167; 264/177.12; 264/209.2
(58) Field of Classification Search ..................... None
   See application file for complete search history.

(56) References Cited

U.S. PATENT DOCUMENTS

| 3,464,450 | A | * | 9/1969 | Steffenini ................... 138/113 |
| 3,932,090 | A | * | 1/1976 | Brumlik ...................... 425/381 |
| 3,983,283 | A | | 9/1976 | Bagley |
| 4,177,307 | A | | 12/1979 | Torii et al. |
| 4,242,075 | A | | 12/1980 | Higuchi et al. |
| 4,276,071 | A | | 6/1981 | Outland |
| 4,416,676 | A | | 11/1983 | Montierth |
| 4,814,187 | A | | 3/1989 | Inoue et al. |
| 5,047,193 | A | * | 9/1991 | Rinkewich ................. 264/155 |
| 5,314,650 | A | * | 5/1994 | Adler et al. ................ 264/630 |
| 5,487,865 | A | | 1/1996 | Hampton et al. |

(Continued)

FOREIGN PATENT DOCUMENTS

JP  9-248445  * 9/1997

(Continued)

*Primary Examiner*—Mark Eashoo
(74) *Attorney, Agent, or Firm*—Laurence A. Greenberg; Werner H. Stemer; Ralph E. Locher

(57) ABSTRACT

A process is provided for producing extruded honeycomb bodies with passages, in particular as catalyst carrier bodies for the cleaning of exhaust gas from an internal combustion engine. The passages are bounded by wall regions which are at least partly provided with structures. The honeycomb body is extruded with an extrusion die in such a way that an additional relative movement between the honeycomb body and the extrusion die takes place, leading to a deformation of the wall regions of the passages. An extrusion die for producing extruded honeycomb bodies includes a multiplicity of secured profiled pins and a housing, which together form an extrusion mask. The extrusion mask is variable during the production process, so that wall regions with the structures can be formed. Honeycomb bodies which have structures in the interior that are suitable for influencing a stream of fluid flowing through can therefore be produced in a manner which is simple in terms of production engineering.

9 Claims, 2 Drawing Sheets

U.S. PATENT DOCUMENTS

| | | | |
|---|---|---|---|
| 5,525,291 A * | 6/1996 | St. Julien | 419/41 |
| 5,633,066 A * | 5/1997 | Lipp et al. | 428/116 |
| 5,678,165 A * | 10/1997 | Wu | 419/37 |
| 5,891,487 A * | 4/1999 | Parise | 425/319 |
| 6,039,908 A * | 3/2000 | Brew et al. | 264/177.12 |
| 6,299,958 B1 * | 10/2001 | St. Julien et al. | 428/73 |
| 6,391,421 B1 | 5/2002 | Brück et al. | |
| 2002/0125607 A1 * | 9/2002 | Herrington | 264/171.27 |

FOREIGN PATENT DOCUMENTS

| | | |
|---|---|---|
| WO | 98/33593 | 8/1998 |

* cited by examiner

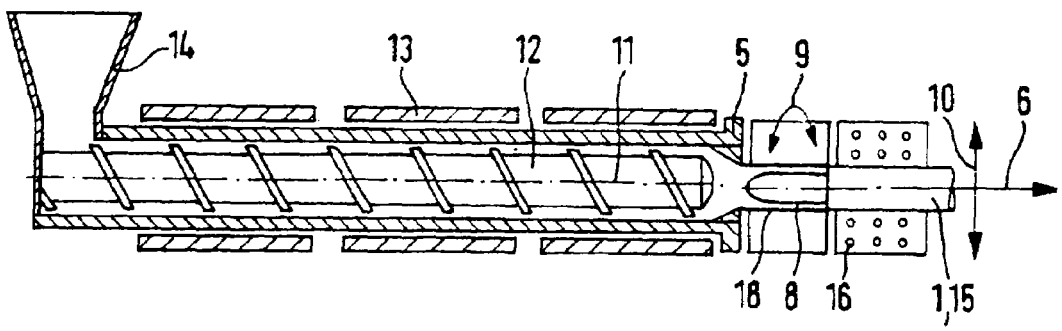
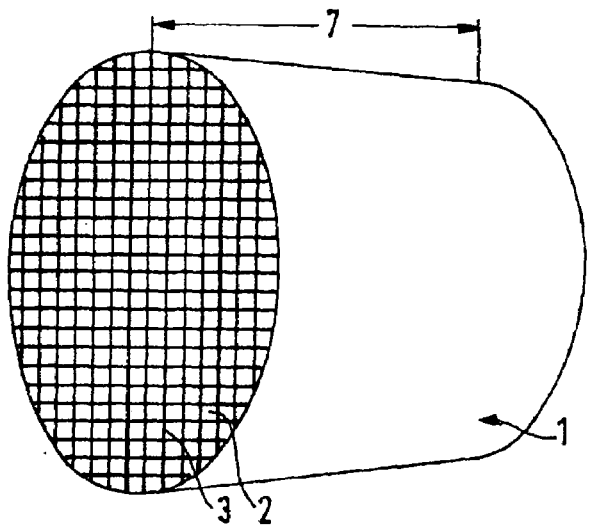
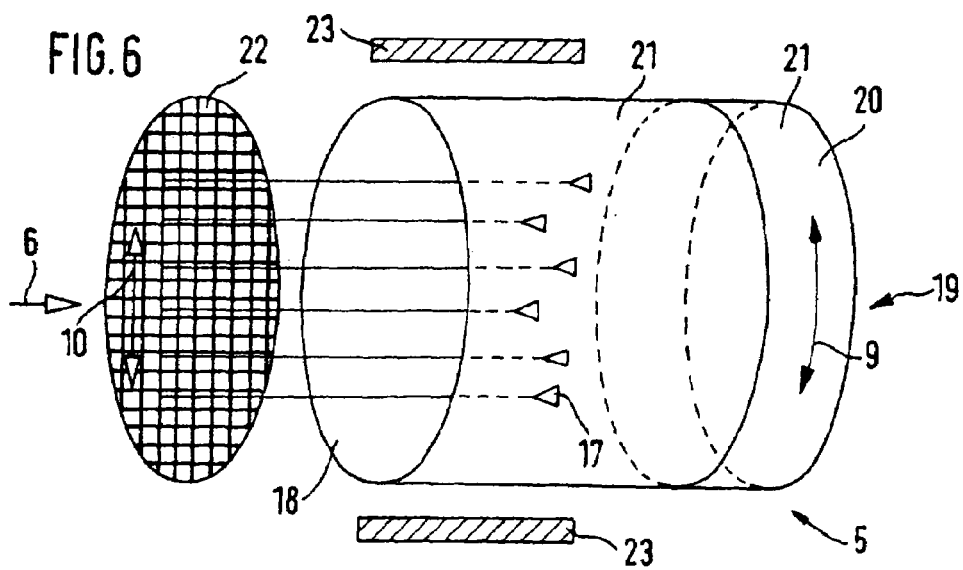

PROCESS FOR PRODUCING EXTRUDED HONEYCOMB BODIES AND EXTRUSION DIE

CROSS-REFERENCE TO RELATED APPLICATION

This application is a continuation of copending International Application No. PCT/EP02/02122, filed Feb. 28, 2002, which designated the United States and was not published in English.

BACKGROUND OF THE INVENTION

FIELD OF THE INVENTION

The invention relates to a process for producing extruded honeycomb bodies with passages which are bounded by wall regions that at least partly have structures. Such honeycomb bodies are used in particular as catalyst carrier bodies for the emission control or cleaning of exhaust gas from an internal combustion engine. The invention also relates to an extrusion die for producing such honeycomb bodies.

The main portion of such an extruded honeycomb body is usually made of ceramic material. In that case, the extrusion process usually proceeds by feeding partly ceramic raw materials to an extruder. The extruder mixes and compacts, if need be, the different raw materials with the aid of what is known as a screw and conveys the composition to the extrusion die. The compacted composition is then forced through the extrusion die, usually creating endless profiles, which are subsequently thermally treated. In that case, the precise form of an extruded honeycomb body depends primarily on the extrusion die, which in principle forms a mask. Before the thermal treatment, a honeycomb body which is extruded in such a way is known as a "green compact", having essentially smooth contours of passage walls passing through the honeycomb body as a result of the production process.

However, it is desirable to provide the passage walls in the interior of the honeycomb body with structures, as is already done with good results in the case of metallic honeycomb bodies. This is done with a view to the preferred use of ceramic honeycomb bodies of this type as catalyst carrier bodies in an exhaust system. Normally, the passage walls are provided with a catalytically active coating. In that regard, it must be ensured that the exhaust gas flowing through the honeycomb body has intensive contact with the catalytically active surface to ensure that the exhaust gas is effectively cleaned of pollutants. The structures of the passage walls consequently lead to swirling of the exhaust gas flowing through, to intensified diffusion, and/or prolong the dwell time of the exhaust gas in the honeycomb body, without the external dimensions of the honeycomb body having to be changed.

A process for producing ceramic honeycomb bodies with passages having structures is known, for example, from U.S. Pat. No. 5,487,865. In that case, it is proposed to initially extrude regularly constructed honeycomb bodies. The green compacts are subsequently joined together in such a way that they are offset relative to one another. In particular, it is proposed to subdivide the extruded green compacts into slice-shaped segments, to turn them with respect to one another and to put them together. The individual slices are joined together to form the final honeycomb body by using a sintering process. In that way, a twisting flow path can be produced in the honeycomb body. However, the production of structures of the passage walls in a manner corresponding to that process proves to be very difficult, in particular from production engineering aspects. The number of structures per passage is dependent on the thickness of the segments, since a structure is only created in each case at the edges of the slice-shaped segments according to that process. Accordingly, the segments must be made relatively thin to generate a high number of structures per passage, as a result of which automated production of such honeycomb bodies presents great problems.

SUMMARY OF THE INVENTION

It is accordingly an object of the invention to provide a process for producing extruded honeycomb bodies and an extrusion die that is suitable, in particular, for the production of such honeycomb bodies, which overcome the hereinafore-mentioned disadvantages of the heretofore-known processes and devices of this general type, in which the production of structures of passage walls is possible even in a high number per passage length and in which the reliability of the process with regard to a continuous production of such honeycomb bodies is improved.

With the foregoing and other objects in view there is provided, in accordance with the invention, a process for producing extruded honeycomb bodies, in particular as catalyst carrier bodies for the cleaning of exhaust gas from an internal combustion engine. The process comprises extruding a honeycomb body with an extrusion die forming passages bounded by wall regions and at least partly providing the wall regions with structures. An additional relative movement is performed between the honeycomb body and the extrusion die, leading to a deformation of the wall regions of the passages.

This means that, directly after leaving the extrusion die, the extruded green compact is moved relative to the extrusion mask. This has the effect of continuously producing a strand profile, which can ultimately be cut off to the desired length. The relative movement in this case is to be set in such a way that damage to the passage walls, in particular breaking up of wall regions or clogged passages, is avoided. Consequently, ceramic honeycomb bodies of consistent quality with regard to the structured passage walls can be produced, even with a view to mass production.

In accordance with another mode of the invention, the relative movement is performed as a rotation between the extrusion die and the honeycomb body. It involves at least the extrusion die or the honeycomb body rotating temporarily during the extrusion. Such a rotation may lead to a thread-shaped configuration of the passages, with the passage length being increased in relation to the axial extent of the honeycomb body. The rotational speed in this case is dependent on the material being used and the extrusion mask being used. Thus, the more intricate the extruded passage walls, the lower the rotational speed to be selected, to avoid damaging them.

In accordance with a further mode of the invention, the relative movement is generated by at least temporarily offsetting the honeycomb body or the extrusion die in relation to a preferred direction of extrusion. This allows passages which have shoulders or steps to be formed and it is possible for the passage wall thickness to be kept essentially constant. With regard to such honeycomb bodies being used as catalyst carrier bodies, the steps or shoulders serve as flow deflecting surfaces, so that a swirling of the exhaust gas flowing through is achieved.

In accordance with an added mode of the invention, the honeycomb body is stretched and/or compressed at least temporarily during the extrusion. The compressing or stretching of the green compact, in particular immediately after leaving the extrusion die, results in different material distributions of the honeycomb body in the direction of extrusion. In this way, the wall regions of the passages are made to differ in thickness. Consequently, for example, annular, bead-like microstructures are created on the wall regions of the passages. This compressing and/or stretching operation is in this case to be performed in such a way that closing of the passages is prevented.

In accordance with an additional mode of the invention, the honeycomb body and/or the extrusion die perform an oscillating movement in relation to a preferred direction of extrusion at least temporarily during the extrusion. In this way, wave-shaped passages are formed, with the frequency of the oscillating movement ultimately defining the number of structures over the passage length. In this way, structures distributed relatively uniformly over the passage length are produced, with a high number of structures per passage length also being generated.

In accordance with yet another mode of the invention, the honeycomb body is thermally treated directly after leaving the extrusion die. In this case, the green compact is preferably cooled, in order to solidify the generated structures of the wall regions of the passages.

In accordance with yet a further mode of the invention, the honeycomb body with the generated structures is subsequently cut off to a desired length. The length is dependent in this case in particular on the later intended use of the honeycomb body. In this case it is particularly advantageous to treat the honeycomb body thermally after it has been cut off. In this treatment, the strength of the honeycomb body in particular is increased by a sintering process. This ensures that a honeycomb body produced in this way withstands the high thermal and dynamic loads in an exhaust system of an internal combustion engine even over a long time period.

With the objects of the invention in view, there is also provided an extrusion die for producing extruded honeycomb bodies with passages bounded by wall regions. The extrusion die comprises a multiplicity of secured profiled pins and a housing, together forming an extrusion mask. The extrusion mask is variable during extrusion to provide the wall regions with structures.

What is meant herein in particular by an extrusion mask is the free region of a cross-sectional surface that is disposed essentially perpendicularly to the direction of extrusion. The raw extrusion material can flow through that free region and through the preferably greatest cross section of the profiled pins (likewise perpendicularly to the direction of extrusion). The extrusion mask consequently corresponds essentially to a cross section of the extruded honeycomb body. The shaping of the honeycomb body is accordingly influenced directly with the aid of an extrusion mask of this type, which can be varied over time. For example, different wall regions can be influenced with regard to their thickness or position in relation to one another.

In accordance with another feature of the invention, at least a predeterminable number of the profiled pins and at least subregions of the housing are movable in relation to one another. A relative movement of this type may be performed as a rotational movement and/or transversely to the preferred direction of extrusion.

In accordance with a further feature of the invention, the housing is constructed with segments which are displaceable with respect to one another. Segments with partly elastic properties, which are preferably disposed close to the outlet side of the extrusion die, in order to avoid the green compact from being damaged on the outer wall, are suitable in particular in this case. If appropriate, the structured outer wall of the green compact created in this way is given the desired smooth outer surface in a downstream peeling process.

In accordance with an added feature of the invention, a holder for the profiled pins is movable in relation to the housing. This holder is in this case preferably disposed outside the shaping housing and has, in particular, a grid-mesh-like structure. The grid points are primarily used for fastening or fixing the profiled pins in the housing. The holder may in this case be moved transversely in relation to the preferred direction of extrusion or, for example, rotatably. It is particularly advantageous to make the holder of the profiled pins bendable, with the housing being bent or twisted with respect to the profiled pins to produce the relative movement of the latter. The position of the profiled pins in relation to one another is changed in the case of a relatively rigid connection of the profiled pins to the holder.

In accordance with an additional feature of the invention, at least a predeterminable number of profiled pins are made from a ferromagnetic material, and the extrusion die includes a magnetizing device which brings about the relative movement of the profiled pins with respect to the housing. If the profiled pins are made of a ferromagnetic material, the generation of a magnetic field in the region of the profiled pins can lead to a temporary magnetization of the profiled pins, with the latter moving, for example, towards one another. After the degeneration of such a magnetic field, these profiled pins once again resume their original position. In this case, the magnetic field can, in particular, influence the frequency of the relative movement.

In accordance with a concomitant feature of the invention, the profiled pins have a variable outer form or shape. This has a direct effect on the extrusion mask, for example by changing its cross section perpendicularly to the direction of extrusion.

Other features which are considered as characteristic for the invention are set forth in the appended claims.

Although the invention is illustrated and described herein as embodied in a process for producing extruded honeycomb bodies and an extrusion die, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, sectional view of a device suitable for carrying out the proposed process;

FIG. 2 is a perspective view of an extruded honeycomb body;

FIG. 6 is an exploded perspective view illustrating the construction of an embodiment of an extrusion die.

DESCRIPTION OF THE PREFERRED EMBODIMENTS

Figure 3:
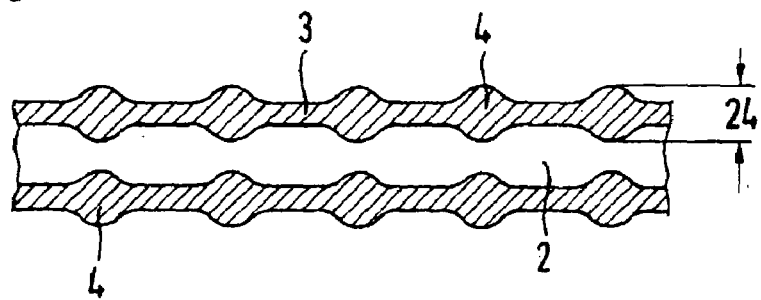
FIG. 3 is a fragmentary, sectional view showing a first embodiment of structures of passage walls.

Referring now to the figures of the drawings in detail and first, particularly, to FIG. 1 thereof, there is seen a diagrammatic illustration of a device for producing extruded honeycomb bodies 1 with passages 2 (illustrated in other figures), in particular as catalyst carrier bodies for the cleaning of exhaust gas from an internal combustion engine. The passages 2 are bounded by wall regions 3 (illustrated in other figures), which are at least partly provided with structures 4 (illustrated in other figures). The honeycomb body 1 is extruded with an extrusion die or tool 5 in such a way that an additional relative movement 9, 10, 11 between the honeycomb body 1 and the extrusion die 5 takes place, leading to a deformation of the wall regions 3 of the passages 2.

In this process, an appropriate granular material (for example including ceramic powder, metallic additives, lubricants) is introduced into a filling hopper 14 of an extruder and mixed up and compacted with the aid of a screw 12. In order to assist this process, the device is constructed in the region of the screw 12 with a heating device 13, which ensures good moldability of the starting material. The extrusion die 5 has an outer die ring or nozzle 8, which is essentially bounded by a housing 18. The outer die ring 8 forms an extrusion mask 19, which ultimately establishes the shaping of the honeycomb body 1 or of a continuously produced strand 15. The strand 15 emerging from the outer die ring 3 is fixed by a holding device 16. The honeycomb body 1 or strand 15 in this case emerges from the outer die ring 8 in a preferred direction of extrusion 6. In order to generate the structure 4 on the wall regions 3 of the honeycomb body 1, the device allows, for example, a rotation 9 of the outer die ring 8 and a displacement of the produced honeycomb body 1 or strand 15 in a transverse direction 10 through the use of the holding device 16. Consequently, various honeycomb bodies 1 with different structures 4 can be produced in a continuous process, with a formation of structures 4 of uniform quality being ensured.

FIG. 2 shows an extruded honeycomb body 1 made of ceramic material. The honeycomb body 1 has a multiplicity of passages 2, which are bounded by wall regions 3. The illustrated honeycomb body 1 is cylindrical and has a predeterminable length 7. It is desirable to choose the number of passages 2 to be as high as possible, with a view to the use of a honeycomb body 1 of this type as a catalyst carrier body in the exhaust system of an internal combustion engine. In this case, passage densities of greater 600 cpsi (cells per square inch), in particular greater than 800 cpsi, are preferred.

FIG. 3 shows a first embodiment of the passage 2, which is produced by the proposed process, in the honeycomb body 1. The wall regions 3 which bound the passage 2 have the structures 4 that can be produced, for example, by a temporary compression of the honeycomb body 1 during the extrusion. In this case, the structures 4 are formed by a varying thickness 24 of the wall regions 3. During the compressing operation, material accumulations briefly occur, as a consequence of which the wall regions 3 are made thicker.

Figure 4:
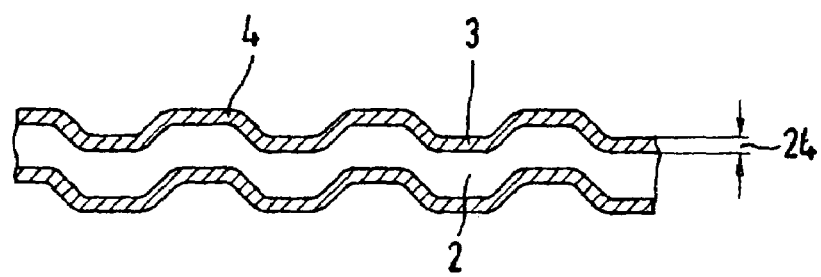
FIG. 4 is a fragmentary, sectional view showing a second embodiment of structures of the passage walls.

FIG. 4 shows a further fragmentary, diagrammatic, sectional view of a passage 2. The illustrated structure 4 of the wall regions 3 was produced, for example, by a relative offset of the extrusion die 5 with respect to the honeycomb body 1 or the strand 15. In contrast with the embodiment represented in FIG. 3, the one shown in this case has an essentially constant thickness 24 of the wall regions 3.

Figure 5:
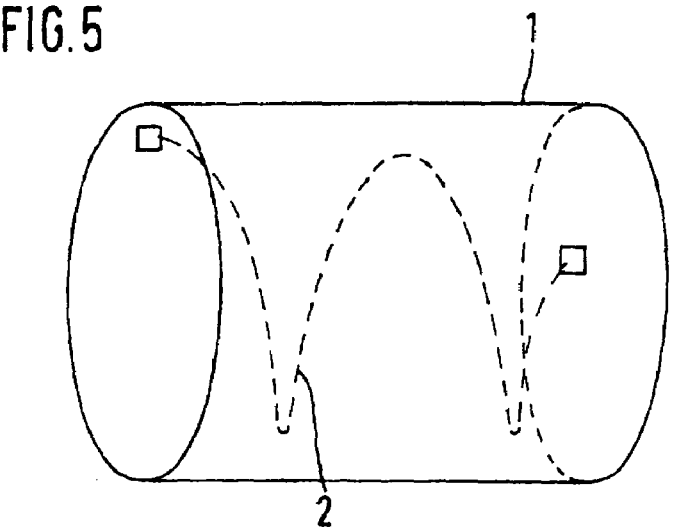
FIG. 5 is a perspective view showing a third embodiment of passages in a honeycomb body.

FIG. 5 shows a diagrammatic and perspective view of an embodiment of a passage 2 of a honeycomb body 1, with a continuous rotation of the honeycomb body 1 relative to the extrusion die 5 in the direction of movement 9 having taken place during the extrusion operation. In this way, a passage 2 which has an essentially thread-like configuration was formed. This leads to a prolonged dwell time of the exhaust gas in the honeycomb body 1 with a view to the use of a honeycomb body of this type for exhaust gas cleaning or emission control, Improving effectiveness in terms of pollutant conversion.

FIG. 6 shows a diagrammatic and perspective view of a preferred embodiment of the extrusion die 5 according to the invention. The extrusion die 5 is suitable for producing extruded, in particular ceramic, honeycomb bodies 1 (not shown in FIG. 6). The extrusion die 5 has a multiplicity of secured profiled pins 17 and the housing 18, which form an extrusion mask 19. The extrusion mask 19 is variable during the production process, so that honeycomb bodies 1 with wall regions 3 which have structures 4 can be produced. In this case, the non-illustrated extrusion material is conveyed initially in the direction of extrusion 6 through a holder or fastening 22, which is represented in the form of a grid. The profiled pins 17, which extend as far as into inner regions of the housing 18, are fastened to the holder 22. In this case, a subregion 20 of the housing 18 is movable relative to the profiled pins 17. For this purpose, the housing 18 is subdivided into segments 21, with the segment 21 disposed last in the direction of extrusion 6 being made in such a way that it is rotatable in the direction of movement 9. As a consequence thereof, for example, a honeycomb structure generated with the aid of the profiled pins 17 is twisted directly thereafter with, for example, essentially thread-like passages 2 being formed.

As an alternative thereto, the illustrated embodiment of an extrusion die 5 offers the possibility of changing the position of the profiled pins 17 relative to one another. In this case it is possible, for example, to bend the holder 22, so that the position of the profiled pins 17 relative to one another is changed. In addition, the illustrated extrusion die 5 has a magnetizing device 23, which can influence the profiled pins 17 that are formed of ferromagnetic material, with regard to their position in relation to one another or in relation to the housing 18. The extrusion die 5 also offers a third possibility, of moving the profiled pins 17 relatively with respect to the housing 18. For this purpose, the holder 22 is constructed in such a way that it makes a displacement in the transverse direction 10 possible.

The inventive process for producing extruded honeycomb bodies, with passages which have structures in the interior, and an extrusion die which is suitable in particular for carrying out this process, allow the production of a multiplicity of structures which are suitable, in particular, for influencing a stream of fluid flowing through. This is accomplished in a way which is simple in terms of production engineering.

What is claimed is:

1. A process for producing extruded honeycomb bodies, which comprises:

extruding a honeycomb body with an extrusion die forming passages bounded by wall regions and at least partly providing the wall regions with structures;

at least temporarily performing an oscillating movement during extrusion with the honeycomb body relative to a preferred direction of extrusion;

performing an additional relative movement between the honeycomb body and the extrusion die, leading to a deformation of the wall regions of the passages; and at least temporarily compressing and stretching the honeycomb body during extrusion for producing a varying thickness of the wall regions.

2. The process according to claim 1, which further comprises at least temporarily rotating the extrusion die during extrusion.

3. The process according to claim 1, which further comprises at least temporarily rotating the honeycomb body during extrusion.

4. The process according to claim 1, which further comprises at least temporarily offsetting the extrusion die during extrusion relative to a preferred direction of extrusion.

5. The process according to claim 1, which further comprises at least temporarily offsetting the honeycomb body during extrusion relative to a preferred direction of extrusion.

6. The process according to claim 1, which further comprises directly thermally treating the honeycomb body after leaving the extrusion die.

7. The process according to claim 1, which further comprises cutting-off the honeycomb body with the structures to a desired length subsequent to extrusion.

8. The process according to claim 7, which further comprises thermally treating the honeycomb body after the cutting-off step.

9. A process for producing extruded honeycomb catalyst carrier bodies for the cleaning of exhaust gas from an internal combustion engine, the process which comprises:

extruding a honeycomb catalyst carrier body with an extrusion die forming passages bounded by wall regions and at least partly providing the wall regions with structures;

at least temporarily performing an oscillating movement during extrusion with the honeycomb catalyst carrier body relative to a preferred direction of extrusion; and performing an additional relative movement between the honeycomb catalyst carrier body and the extrusion die, leading to a deformation of the wall regions of the passages; and at least temporarily compressing and stretching the honeycomb catalyst carrier body during extrusion for producing a varying thickness of the wall regions.

* * * * *